(12) United States Patent
Eckstein et al.

(10) Patent No.: US 10,232,763 B1
(45) Date of Patent: Mar. 19, 2019

(54) SOLID STATE ADAPTIVE HEADLIGHT

(71) Applicant: Atieva, Inc., Menlo Park, CA (US)

(72) Inventors: Wiebke Eckstein, Redwood City, CA (US); Hans-Christoph Eckstein, Redwood City, CA (US); Eric Magnus Bach, Newark, CA (US)

(73) Assignee: ATIEVA, INC., Newark, CA (US)

( * ) Notice: Subject to any disclaimer, the term of this patent is extended or adjusted under 35 U.S.C. 154(b) by 0 days.

(21) Appl. No.: 15/822,951

(22) Filed: Nov. 27, 2017

(51) Int. Cl.
*B60Q 1/08* (2006.01)
*B60Q 1/16* (2006.01)

(52) U.S. Cl.
CPC ............... *B60Q 1/085* (2013.01); *B60Q 1/16* (2013.01); *B60Q 2300/056* (2013.01); *B60Q 2300/45* (2013.01)

(58) Field of Classification Search
USPC ......................................................... 362/465
See application file for complete search history.

(56) References Cited

U.S. PATENT DOCUMENTS

| | | | |
|---|---|---|---|
| 6,155,694 A * | 12/2000 | Lyons | B60Q 1/2611 315/178 |
| 7,515,357 B2 | 4/2009 | Segawa et al. | |
| 2011/0249460 A1 | 10/2011 | Kushimoto | |
| 2017/0203683 A1 | 7/2017 | Noronha et al. | |
| 2017/0234498 A1 | 8/2017 | Scheibner et al. | |
| 2017/0261173 A1 | 9/2017 | Suzuki | |
| 2017/0276311 A1 | 9/2017 | Hiki | |

OTHER PUBLICATIONS

M. Sieler et al., Microoptical Array Projectors for Free-Form Screen Applications, Optics Express, vol. 21, No. 23, Nov. 18, 2013.

* cited by examiner

*Primary Examiner* — Jamara A Franklin
(74) *Attorney, Agent, or Firm* — Patent Law Office of David G. Beck

(57) ABSTRACT

An adaptive light module for incorporation into a vehicle's headlight assembly is provided, where the light module may be incorporated as a single unit, or incorporated as one of a plurality of units. The light module, which uses an LED array, collimating optics, illumination and projection micro-lens-arrays (HLAs), is configured to allow tailoring of the illumination intensity distribution by selectively activating/deactivating subsets of the LED array.

23 Claims, 7 Drawing Sheets

SOLID STATE ADAPTIVE HEADLIGHT

FIELD OF THE INVENTION

The present invention relates generally to vehicle headlights and, more particularly, to an adaptive headlight system that allows the illumination provided by a vehicle's headlights to be tailored to current driving conditions.

BACKGROUND OF THE INVENTION

Over the years, a variety of techniques have been used to adapt the illumination pattern provided by a vehicle's headlights to current driving conditions, in particular preventing a vehicle's headlights from dazzling and temporarily blinding the drivers of on-coming vehicles while insuring sufficient illumination when traveling at highway speeds in areas in which there is minimal ambient lighting.

One approach to controlling a light assembly's illumination pattern is through the use of a cut-off bar which, when placed in the assembly's output beam, occludes a portion of the light beam. U.S. Patent Application Serial No. 2017/0203683 discloses such a light assembly, one in which the position of the cut-off bar is controlled by an electromagnet actuator.

U.S. Patent Application Serial No. 2017/0276311 discloses an alternate approach, one in which a mirror is used to alter the light assembly's illumination pattern. As disclosed, a collection mirror comprised of a plurality of inclinable mirror elements is located between the optical member that collects the light emitted by an LED light source and a light projection element. By controlling the position of the elements comprising the collection mirror, predetermined light distribution patterns can be formed.

While there are a variety of techniques that may be used to control the light distribution pattern from a vehicle's headlight assembly, these techniques provide limited adaptability, typically providing only two states of operation: high beams and low beams. Accordingly, what is needed is a vehicle headlight assembly that is capable of providing a variety of distribution patterns along with improved performance, where performance is assessed on the qualities of illumination homogeneity, manufacturing ease, cost, and output efficiency. The present invention provides such a light assembly.

SUMMARY OF THE INVENTION

The present invention provides an adaptive light module that may be incorporated singularly, or as one of a plurality of light modules, within a vehicle's headlight assembly. The light module is comprised of (i) an LED light source, more particularly an LED array (i.e., 1- or 2-dimensional array) that includes a plurality of LEDs; (ii) an illumination microlens-array (MLA), where a first focal length corresponds to the illumination MLA; (iii) a projection MLA, where a second focal length corresponds to the projection MLA, and where the first focal length is greater than the second focal length; (iv) at least one collimating optic interposed between the light source and the illumination MLA, where the collimating optic is configured to collimate light generated by the LED light source prior to the light entering the illumination MLA; and (v) an aperture layer interposed between the projection MLA and the illumination MLA, where the aperture layer is configured to provide a cut-off in the illumination field-of-view (FoV) generated by the adaptive light module.

In one aspect, the plurality of LEDs may be divided into at least first and second LED subsets, where the illumination and projection MLAs direct light generated by the first LED subset in a first direction and direct light generated by the second LED subset in a second direction, and where a light control system coupled to the LED light source is configured to selectively and independently activate the first and second LED subsets.

In another aspect, the plurality of LEDs comprising the LED array may be divided into a plurality of LED groups and the at least one collimating optic may be comprised of a plurality of collimating optics corresponding to the plurality of LED groups. The optical axis of at least one of the LED groups may be displaced, or tilted, relative to the optical axis of the corresponding collimating optic.

In another aspect, the first focal length corresponding to the illumination MLA may correspond to the y-axis of each of the plurality of illumination optical elements comprising the illumination MLA and the second focal length corresponding to the projection MLA may correspond to the y-axis of each of the plurality of projection optical elements comprising the illumination MLA, where the y-axis corresponds to a horizontal plane. A third focal length may correspond to the z-axis of each of the plurality of illumination optical elements comprising the illumination MLA and a fourth focal length may correspond to the z-axis of each of the plurality of projection optical elements comprising the projection MLA, where the z-axis is orthogonal to the y-axis. Preferably the first focal length is larger than the third focal length. In at least one embodiment, the cross-section of the illumination and projection optical elements has a non-regular hexagonal shape, where the non-regular hexagonal shape is defined by a first width and a second width and where the ratio of the first width to the second width is preferably between 1.5:1 and 3:1. In at least one embodiment, the cross-section of the illumination and projection optical elements has a rectangular shape, where the rectangular shape is defined by a first width and a second width and where the ratio of the first width to the second width is preferably between 1.5:1 and 3:1.

In another aspect, the distance between the aperture layer and the outer lens surface of the illumination MLA is less than the first focal length. The aperture layer may be applied, for example using a deposition process, onto the planar side of the illumination MLA. Alternately, the aperture layer may be applied, for example using a deposition process, onto the planar side of the projection MLA.

In another aspect, the collimating optic may be comprised of a plurality of collimating optics that correspond to the plurality of LEDs comprising the LED array.

In another aspect, the plurality of illumination optical elements comprising the illumination MLA may be aligned with the plurality of projection optical elements comprising the projection MLA.

In another aspect, the plurality of illumination optical elements comprising the illumination MLA may be displaced (i.e., not aligned) with the plurality of projection optical elements comprising the projection MLA, where the displacement between the two MLAs is preferably less than 25 percent of the cross-sectional height of an illumination optical element.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
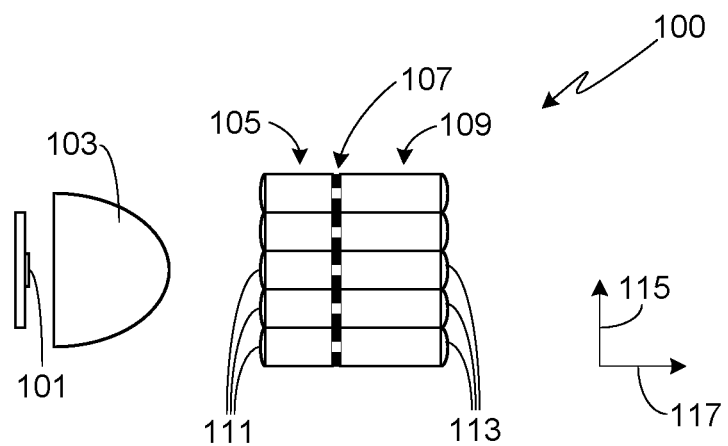
FIG. 1 illustrates the basic design concept of a lighting module configured in accordance with the present invention.

FIG. 1 illustrates the basic design concept of the micro-lens-array (MLA) used in a lighting module 100 designed in accordance with the present invention. As shown, the light emitted by an LED light source 101 is collimated by collimation optics 103 prior to impinging on MLA 105. MLA 105 is also referred to herein as an illumination MLA. The light transmitted by MLA 105 passes through aperture layer 107 before entering a second MLA 109, where MLA 109 may also be referred to herein as a projection MLA. The light exiting MLA 109 directly illuminates the region of interest, i.e., the roadway in front of the vehicle.

Although LED light source 101 may be comprised of a single LED, preferably it is comprised of a plurality of LEDs where the LEDs are either in the form of a linear array, i.e., a 1-dimensional array, or in the form of a 2-dimensional array, also referred to as a matrix LED. By utilizing either a 1-dimensional or 2-dimensional LED array, improved flux and light color can be achieved. Additionally, an array of LEDs that are either individually addressable or addressable by pre-determined groups allows the illumination distribution pattern generated by the module to be varied as desired, for example decreasing light intensity in a region of the output beam that is directed at on-coming traffic, and/or cars that are directly in front of the vehicle, and/or pedestrians, and/or reflective signs, etc. The size of each individually addressable LED should be less than 2 millimeters, while the overall dimensions of the LED array should be less than 6 millimeters.

MLA 105 pre-shapes the intensity distribution of the light from source 101 that impinges on aperture layer 107, thus allowing a highly efficient optical system with minimal losses in the aperture layer. The lens shape for each of the individual lenses 111 comprising MLA 105 may be the same, or they may be different from one another. Lenses 111 can be spherical or aspherical. Similarly, the lens shape for each of the individual lenses 113 comprising MLA 109 may be the same, or they may be different from one another, and they may be either spherical or aspherical. While the focal length of each of the lenses comprising MLA 105 and each of the lenses comprising MLA 109 may be equivalent in the y and z directions, preferably the focal length in the z direction is shorter than the focal length in the y direction, thereby helping to achieve the desired asymmetric illumination field of view (FoV) while decreasing the f-number in z allowing a higher light throughput. The aspect ratio of the illumination FoV is preferably in the range of 3:1 to 10:1, thus illuminating a wider strip of roadway while minimizing the light that may be directly viewed by on-coming drivers. It should be understood that as used herein, the y direction is measured horizontally (i.e., in the horizon plane) and the z direction is measured vertically (i.e., orthogonal to the horizon plane). Therefore in FIG. 1, the z direction is illustrated by line 115, the x direction is illustrated by line 117, and the y direction, which is orthogonal to the x and y axes, would be measured directly into the page.

Preferably the focal length of MLA 105 is greater than that of MLA 109, thereby minimizing losses between adjacent channels, where a channel is considered to be a single optical (i.e., lens) element of a micro-lens-array. In the preferred embodiment of the invention, the focal length associated with MLA 109 is between 0.5 millimeters and 5 millimeters while the focal length associated with MLA 105 is between 0.5 millimeters and infinity. The refractive index for both the illumination and projection MLAs is between 1.4 and 1.8. Preferred materials for the illumination and projection MLAs include glass and a variety of optically transparent resins.

Aperture layer 107, which can be fabricated from any of a variety of materials (e.g., metals such as aluminum and chromium, resins, silicon, etc.) is used to tailor the light distribution and to provide a sharp cut-off line for the light distribution, especially when the assembly is used in a low beam configuration. Given that the aperture layer provides this tailoring function, and given that the cut-off line must be superimposed between MLA elements, it should be understood that the design of the apertures corresponding to each individual lens element of the MLAs may be different, i.e., all apertures of aperture layer 107 can be the same; alternately, all apertures of aperture layer 107 can be different; alternately, aperture layer 107 can be comprised of several groups of apertures where the apertures within each group are the same but the apertures from group to group are different. Accordingly, the shape, size and location of each aperture within layer 107 is individually calculated based on the intended source characteristics, MLA 105, MLA 109, and the desired image in both the near field and far field. Typically aperture layer 107 is deposited directly on, or otherwise applied directly to, the planar side of MLA 105 or the planar side of MLA 109. Layer 107 can be separate from the planar side of MLA 105 as long as the distance between layer 107 and the planar side of MLA 105 is less than the focal length of MLA 105, thus insuring high light throughput.

As noted above, the primary use for aperture layer 107 is to tailor the illumination intensity distribution of the output beam. A secondary use for layer 107 is achieved by including alignment features within the layer. For example, by including a cross that is visible in the near field, multiple light modules 100 located within a single vehicle headlight assembly can be co-aligned. This feature can also be used as a parking aid, for example by providing an indicator that is visible in the near field and which can be used by a driver to identify when the car is sufficiently close to a parking garage wall.

Collimation optics 103 collimate the light emitted by source 101 prior to that light entering MLA 105. In order to minimize cross-talk between adjacent optical elements of the MLAs comprising module 100, collimation optics 103 allows minimal light beam divergence. For example, in one embodiment of the invention, the divergence of the light exiting optics 103 is less than 10° FWHM (full width at half maximum). In one configuration of the invention, a single optic 103 is used to collimate the light from source 101 regardless of the number of LEDs comprising the source. In an alternate configuration, each LED comprising source 101 is matched to a corresponding collimation optic. In yet another alternate configuration, source 101 is divided into groups of LEDs with each group being matched to a corresponding collimation optic. Preferably the focal length of collimation optic(s) 103 is between 6 millimeters and 20 millimeters.

Figure 2:
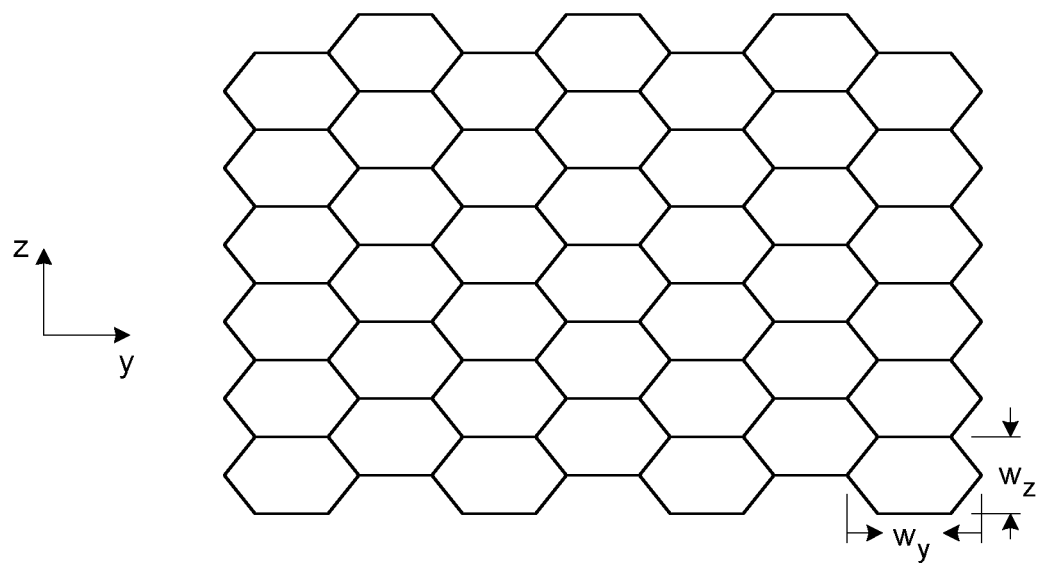
FIG. 2 provides a cross-sectional view of a hexagonal lens configuration applicable to the MLAs used in the present invention.
Figure 3:
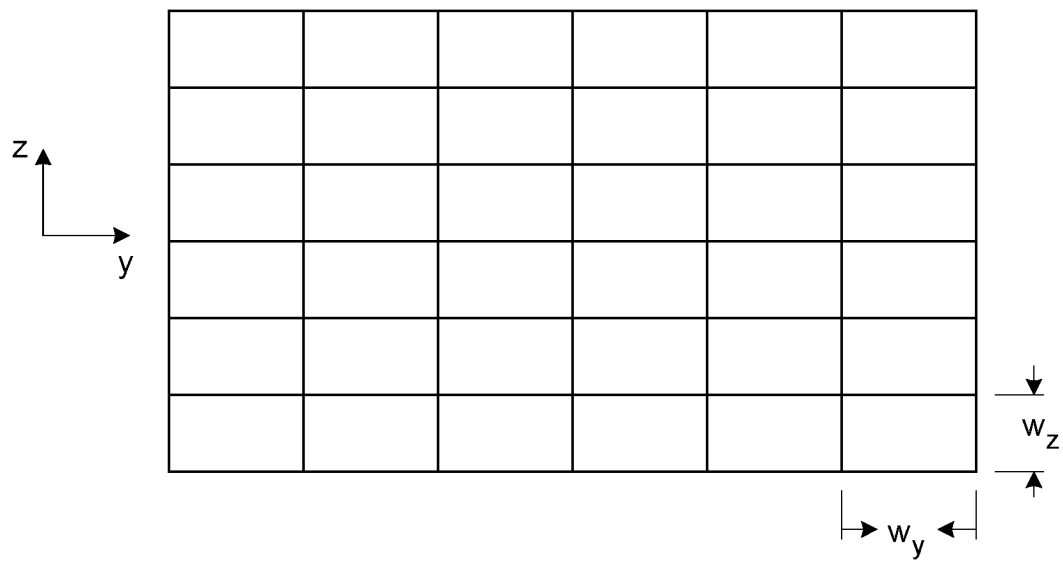
FIG. 3 provides a cross-sectional view of a rectangular lens configuration applicable to the MLAs used in the present invention.

FIGS. 2 and 3 provide preferred cross-sections of the MLAs, both MLA 105 and MLA 109, with FIG. 2 illustrating a non-regular hexagonal lens arrangement and FIG. 3 illustrating a rectangular lens arrangement. In both configurations, and as preferred, the width of each optical element comprising the array in the y direction (i.e., $w_y$) is greater than the width of the same element in the z direction (i.e., $w_z$). Preferably the ratio of $w_y$ to $w_z$ is in the range of 1.5:1 to 3:1, where $w_y$ is in the range of 0.6 millimeters to 3 millimeters and $w_z$ is in the range of 0.4 millimeters to 3 millimeters. Although not required by the invention, the hexagonal configuration is preferred since stray light in the form of ghost images is not directly left and right of the primary intensity distribution, thus reducing cross-talk between adjacent elements.

Figure 4:
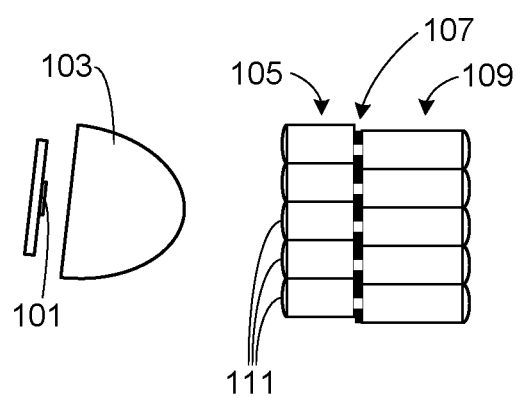
FIG. 4 illustrates a configuration, similar to that shown in FIG. 1, except for the displacement of the projection MLA relative to the illumination MLA.
Figure 5:
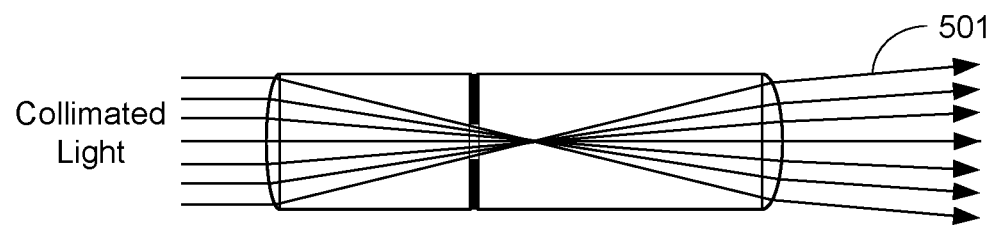
FIG. 5 provides a light ray trace through a single element of a projection MLA and an illumination MLA, where the two elements are aligned in a manner similar to that shown in FIG. 1.
Figure 6:
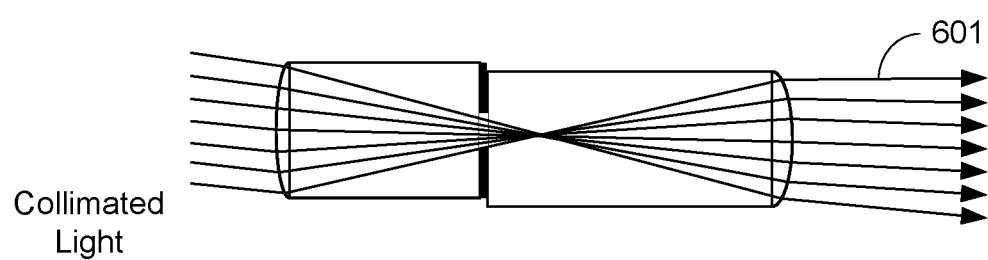
FIG. 6 provides a light ray trace through a single element of a projection MLA and an illumination MLA, where the two elements are shifted in a manner similar to that shown in FIG. 4.

In situations in which it is necessary to shift the illumination intensity distribution downwards, for example to obtain the desired low beam intensity distribution, while still providing high light throughput, the inventors have found that MLA 109 may be shifted downwards relative to MLA 105, thereby displacing the optical elements comprising MLA 109 relative to the optical elements comprising MLA 105. The downward shift of MLA 109 should be less than 25% of $w_z$ in order to insure efficient illumination of the aperture layer 107. An example of this configuration is shown in FIG. 4. FIGS. 5 and 6 provide light ray traces through a single optical element of MLA 105 and a single optical element of MLA 109, with FIG. 5 showing the non-shifted pattern and FIG. 6 showing the shifted pattern. Note that in FIG. 6 the light exiting the assembly is lower relative to the horizon. Furthermore, the angle of the upper-most rays (e.g., ray 601), relative to the horizontal axis, are smaller in the shifted arrangement (FIG. 6) compared to the same rays (e.g., ray 501) in the non-shifted arrangement (FIG. 5), thereby further reducing glare and the potential for dazzling or temporarily blinding on-coming drivers. Additionally, in order to maximize light throughput when shifting MLA 109 downwards, it is necessary to angle the source (e.g., source 101) relative to the illumination and projection MLAs as shown in FIG. 4. This can be accomplished by angling the source itself, or angling the illumination and projection MLAs relative to the source, or by a vertical decenter (in this case upward) of the LED.

Figure 7:
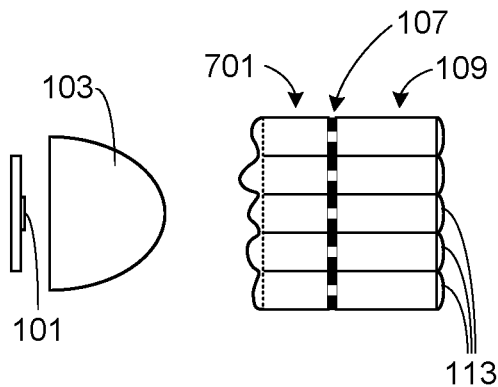
FIG. 7 illustrates a configuration, similar to that shown in FIG. 1, except that the illumination MLA utilizes freeform optical elements.

As previously described, the lens elements comprising MLA 105 and MLA 109 can be spherical or aspherical. In addition, and as illustrated in FIG. 7, the lenses comprising the illumination MLA 701 can also be configured as freeform optics. As used herein, and as generally understood by those of skill in the relevant technologies, freeform optics describe optical shapes/surfaces that have little or no rotational symmetry. This form of optic is typically characterized by a mathematical description such as a Zernike polynomial, an xy polynomial, or characterized by a phase function that can be calculated by an iterative Fourier Transform algorithm, etc.

The illumination system described above, integrated into a vehicle's headlight assembly, can be used to tailor the distribution of light based on current driving conditions, conditions such as city driving in which there are cars immediately preceding the car as well as on-coming traffic; high speed highway driving in which there may be intermittent on-coming cars; both city and highway driving where it is desirable to illuminate a curved road during turning; and incidents in which a pedestrian, sign or other obstacle require the illumination intensity to be varied to minimize temporarily blinding a pedestrian or to improve visibility for the driver.

Figure 8:
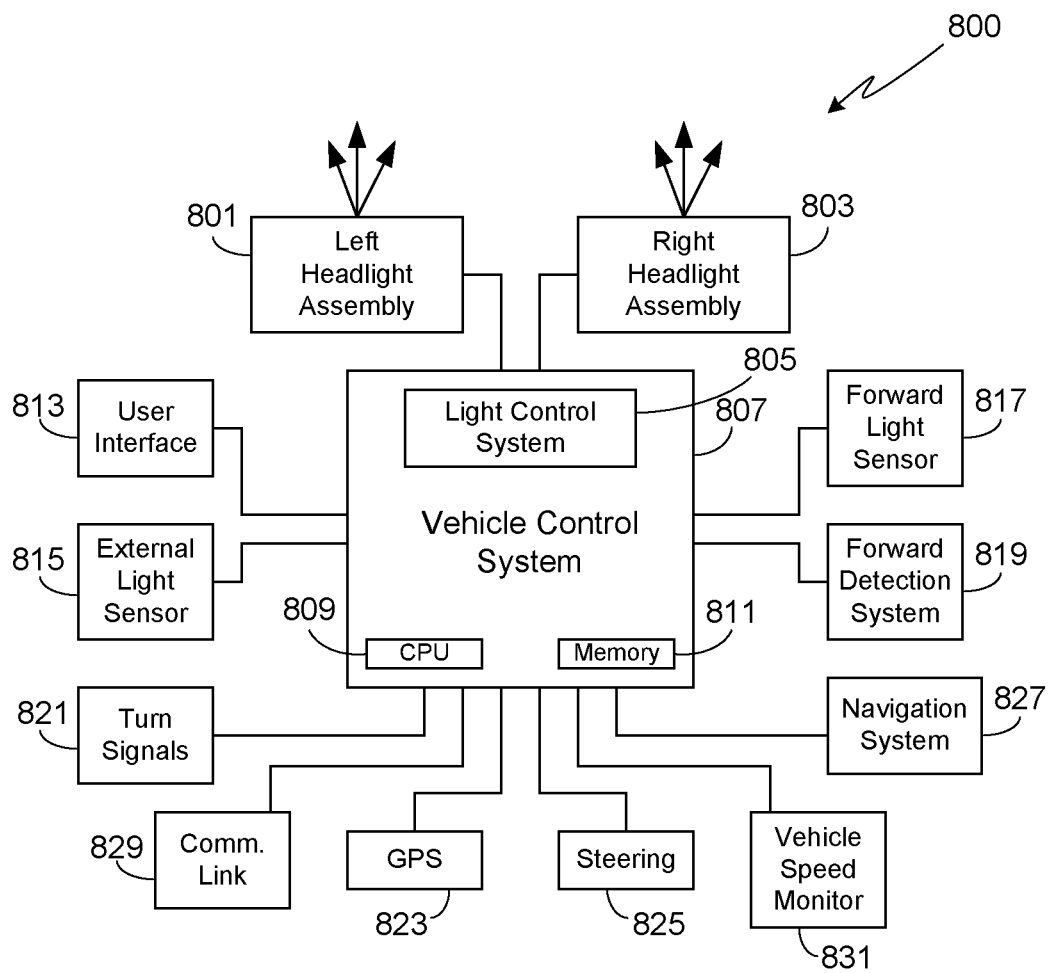
FIG. 8 provides a block diagram of an exemplary headlight control system integrated into a vehicle.

FIG. 8 provides a block diagram of an exemplary headlight control system integrated into a vehicle 800, where each of the headlights, i.e., left headlight assembly 801 and right headlight assembly 803, are controlled by a light control system 805. Light control system 805 may be a separate control system or integrated into the vehicle's control system 807 as shown. System controller 807 is comprised of a central processing unit (CPU) 809 and memory 811, with memory 811 being comprised of EPROM, EEPROM, flash memory, RAM, solid state drive, hard disk drive, or any other type of memory or combination of memory types. In embodiments in which light control system 805 is separate from vehicle control system 807, preferably controller 805 would utilize a different processor and memory from the processor/memory utilized by controller 807.

In some embodiments of the invention, the user manually adjusts the headlights in accordance with current driving conditions. User interface 813, used to manually adjust the headlights, may be in the form of a simple switch (e.g., a switch mounted to the steering column or dashboard), or in the form of a more complex interface (e.g., a dash-mounted touch screen, audio interface utilizing verbal commands, etc.). Manual operation of the lighting may simply allow the driver to switch between a high beam light profile designed to maximize long range visibility and a low beam light profile designed to provide sufficient illumination for driving while minimizing the risk of dazzling or otherwise temporarily blinding the drivers of on-coming cars as well as those cars directly in front of the user's car. In other embodiments, the driver can manually adjust headlight system characteristics other than just the selection of low beam/high beam, characteristics such as maximum light intensity and minimum light intensity.

Preferably some, or all, of the adjustable characteristics of the headlight systems are performed automatically. In at least one embodiment, an ambient light sensor 815 monitors external light levels, allowing the light control system to automatically turn on/off the headlights based on current light levels. In at least one embodiment, a forward looking light sensor 817 monitors light directed at the front of the vehicle. In its simplest implementation, monitor 817 is used to alternate between high beams when no on-coming traffic is detected and low beams when on-coming traffic is detected. If sensor 817 is configured to detect the direction of incident light in addition to light levels, then the headlight control system 805 can alter the light intensity profile of headlights 801/803 to lower light intensity for the region containing the on-coming vehicles while still maintaining higher light intensities for other regions of the roadway. In some configurations, sensor 817 may be used to detect light reflected from objects in front of vehicle 800 and lower the light intensity in those regions, thus lowering the intensity of the light that is reflected back at the driver.

In at least some embodiments, one or more forward looking detectors 819 monitor for objects in front of vehicle 800. Detection system 819 may utilize lidar-based sensors, radar-based sensors, a camera operating in the visible spectrum, a camera operating in the infrared spectrum, electromagnetic sensors, ultrasonic sensors, or other sensor types. Utilizing the information providing by forward looking detectors 819, light control system 805 can alter the light distribution profile to lower light intensity directed at cars directly in front of vehicle 800, or at pedestrians, or at other objects in front of the vehicle where higher light intensities would be inappropriate or undesirable.

In at least some embodiments, light control system 805 alters the light intensity distribution based on upcoming road conditions, for example curves in the road or when the car executes a turn. A variety of sensors and techniques may be used to determine such road conditions. For example, the system can monitor when the driver indicates an upcoming turn by using turn signals 821. The system can also monitor when the car is actually making a turn, for example by monitoring the vehicle's steering system 823. In some embodiments the system alters the light intensity distribution of the headlights based on expected road conditions. In these embodiments the vehicle's location on a map is used to determine upcoming road conditions. Preferably the location of vehicle 800 is provided by an on-board GPS system 825. Road conditions, such as upcoming intersections and road curves, are preferably provided by an on-board navigation system 827, although this same information may be contained in an on-board data base (e.g., a data base stored in memory 811) or obtained from an external data base using a communication link 829. Preferably controller 805 also takes into account vehicle speed, a vehicle characteristic provided by sensor 831.

In a typical vehicle lighting scenario, the desired illumination FoV in the y-direction, i.e., along the horizon, created by the right and left headlight assemblies is 60 degrees, i.e., 30 degrees to either side of the vehicle's centerline. In accordance with the invention, each headlight assembly may contain a single light module or, as preferred, multiple light modules. Although each light module may use a single LED, preferably each module uses an array of LEDs as previously described. In addition to the light source, each light module includes one or more collimating optical elements as well as the necessary illumination/projection MLAs and the interposed aperture layer. In order to achieve both the desired light intensity and light homogeneity within the illuminated FoV, preferably the light system is designed to overlap the illuminated FoV generated by different light sources. The inventors have found that an overlap of 4 degrees or less is preferred.

The present invention provides several means to overlap the illumination FoV that is generated by different light sources within a single headlight assembly. In the first technique, which is schematically illustrated in the simplified view shown in FIG. 9, the LEDs within a single light module 900 are shifted relative to the corresponding collimation optics. As shown, exemplary module 900 uses a light source comprised of a 1-dimensional LED array divided into three LED groups 901-903, with each group consisting of one or more individual LEDs. Corresponding to each group 901-903 of LEDs is a collimation optic 907-909, respectively. The light emitted by the LEDs and collimated by optics 907-909 pass through optical element 911, where optical element 911 includes an illumination MLA, an aperture layer, and a projection MLA as described above. LED group 901 is shifted slightly towards the center of the assembly in a direction 913 relative to collimation optic 907. Similarly, LED group 903 is shifted slightly towards the center of the assembly in a direction 915 relative to collimation optic 909. This shift between LED groups and the corresponding collimation optics is exemplified by the displacement of the optical axis 917 of LED group 903 relative to the optical axis 919 of collimating optic 909. By shifting LED groups 901 and 903 slightly inward relative to their corresponding collimation optical elements, there is a slight overlap in the illumination FoV created by the three LED groups as illustrated.

Figure 9:
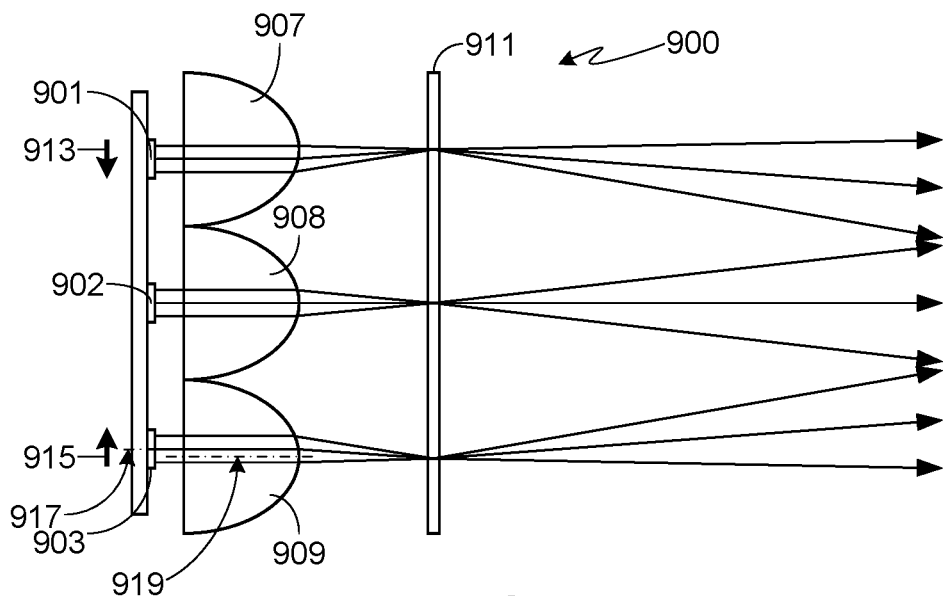
FIG. 9 schematically illustrates a configuration for a single light module with overlapping illumination at the FoV where illumination overlap is achieved by moving individual light sources relative to the corresponding collimation optics.
Figure 10:
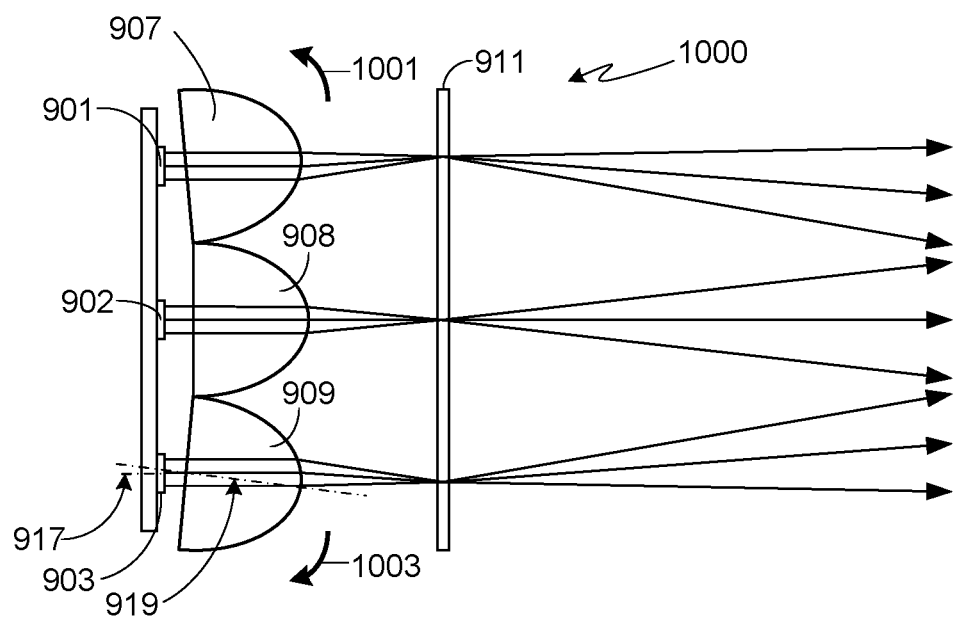
FIG. 10 schematically illustrates a configuration for a single light module with overlapping illumination at the FoV where illumination overlap is achieved by tilting the collimation optics associated with some of the light sources.

FIG. 10 schematically illustrates an alternate approach to achieving overlap in the illumination FoV generated by different light sources within a single light module. As in the prior embodiment and as shown in FIG. 10, module 1000 uses a light source comprised of a 1-dimensional LED array divided into three LED groups 901-903, with each group consisting of one or more individual LEDs. Corresponding to each group of LEDs is a collimation optic 907-909. The light emitted by the LEDs and collimated by optics 907-909 pass through optical element 911. In module 1000, LED groups 901 and 903 are not shifted relative to corresponding collimation optics 907 and 909, respectively, as they were in the embodiment shown in FIG. 9. Rather, and as shown in FIG. 10, collimation optics 907 and 909 are tilted outwardly in directions 1001 and 1003, respectively, relative to the corresponding light sources and relative to central collimation optic 908. Angling LED groups relative to the corresponding collimation optics is exemplified by the tilt of the optical axis 917 of LED group 903 relative to the optical axis 919 of collimating optic 909. Tilting the collimation optics in this manner results in the desired overlap in the illumination FoV created by the three LED groups.

Figure 11:
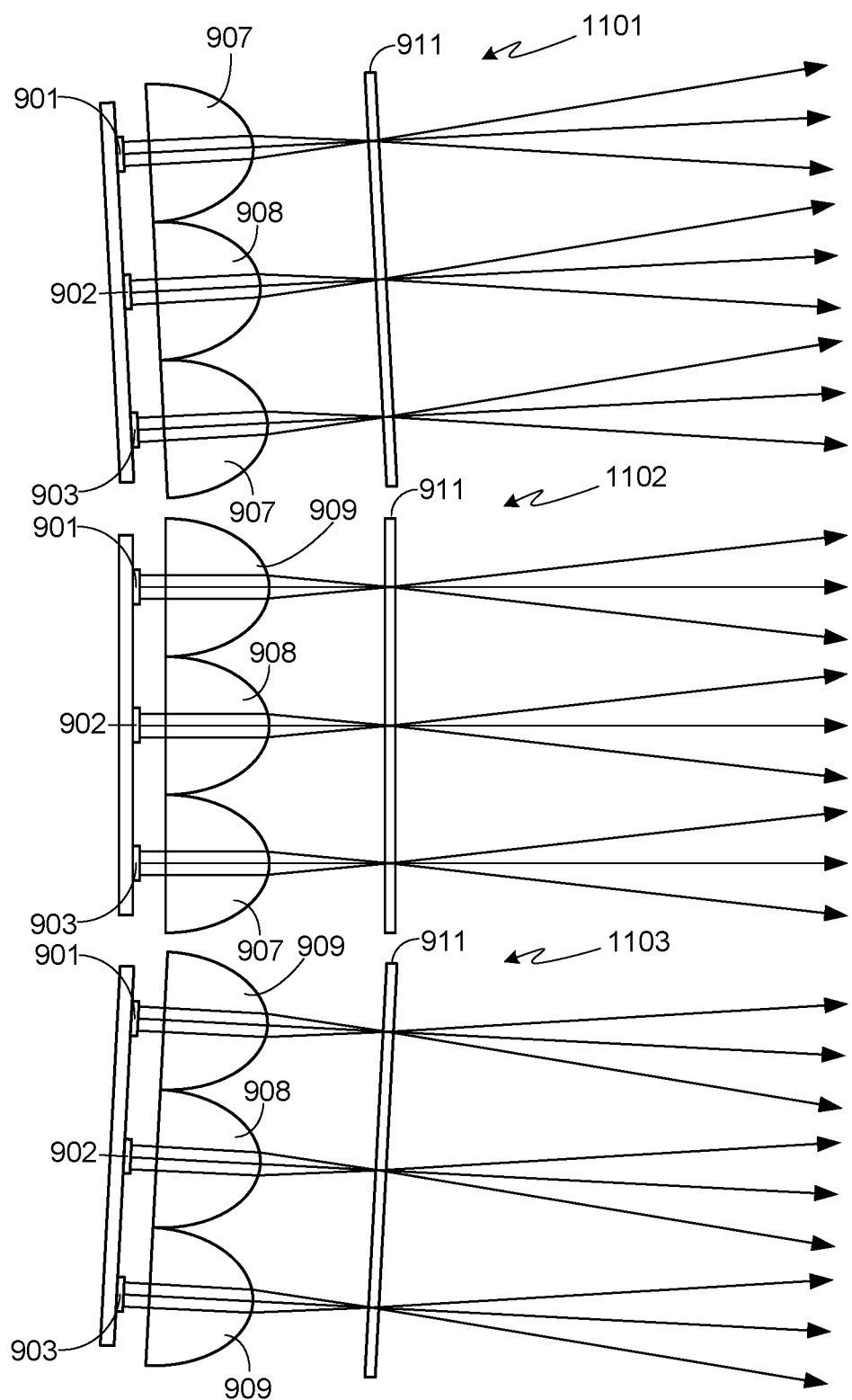
FIG. 11 schematically illustrates a configuration for a light assembly comprised of multiple light modules where illumination overlap at the FoV is achieved by tilting individual light modules relative to one another.

FIG. 11 schematically illustrates an alternate approach to achieving overlap in the illumination FoV generated by different light sources within a single headlight assembly 1100, where the single headlight assembly includes multiple light modules 1101-1103. As in the embodiments shown in FIGS. 9 and 10, each light module includes a light source comprised of a 1-dimensional LED array divided into three LED groups 901-903, with each group consisting of one or more individual LEDs. Corresponding to each group of LEDs is a collimation optic 907-909. While the use of individual collimation optics allows each module to overlap the illumination distribution created by that particular module, in the exemplary embodiment shown in FIG. 11 the relative positions of the sources and collimation optics are not shifted to create overlap, nor are the collimation optics tilted to create overlap. It should be understood that each module 1101-1103 may utilize a single collimation optic, rather than multiple collimation optics, when light overlap is not desired at the module level. In each module 1101-1103, the light emitted by the LEDs and collimated by optics 907-909 pass through optical element 911. In assembly 1100, the individual light modules are angled relative to one another to a sufficient degree to generate the desired overlap in the illumination FoV created by the individual modules.

While the embodiments illustrated in FIG. 9-11 only show overlap in the illumination FoV in the y-direction, it should be understood that the same techniques may be applied to creating illumination overlap in the z-direction, i.e., perpendicular to the horizon, if such overlap is desired.

As previously described, the present lighting system allows the light intensity distribution from the left and right headlight assemblies to be adapted to current driving conditions. Using the light modules described above, there are several means of tailoring the illumination intensity distribution of the FoV. The simplest approach is similar to that used in a conventional light assembly, specifically using multiple light modules directed at different regions of the FoV and then selectively activating particular modules in order to obtain the desired light distribution. For example, a first light module may provide the desired light when the system is in low beam mode; a second light module may be activated, either in addition to or as a replacement for the first module when it is desirable to illuminate a more distant area (i.e., high beam mode); and a third light module may be activated when illuminating corners and other regions outside of the vehicle's forward path, where the third light module may be activated either in addition to the first and/or second modules, or as a replacement light source for the first and/or second modules.

As previously noted, in the preferred embodiments of the light module, the light source (e.g., source 101) is preferably comprised of multiple LEDs, either in the form of a 1-dimensional or a 2-dimensional array, and where the individual LEDs comprising the array, or groups of LEDs comprising the array, are individually addressable. Selective activation of the LEDs within a light module allows the light intensity distribution at the desired illumination FoV to be tailored to current driving needs.

Figure 12:
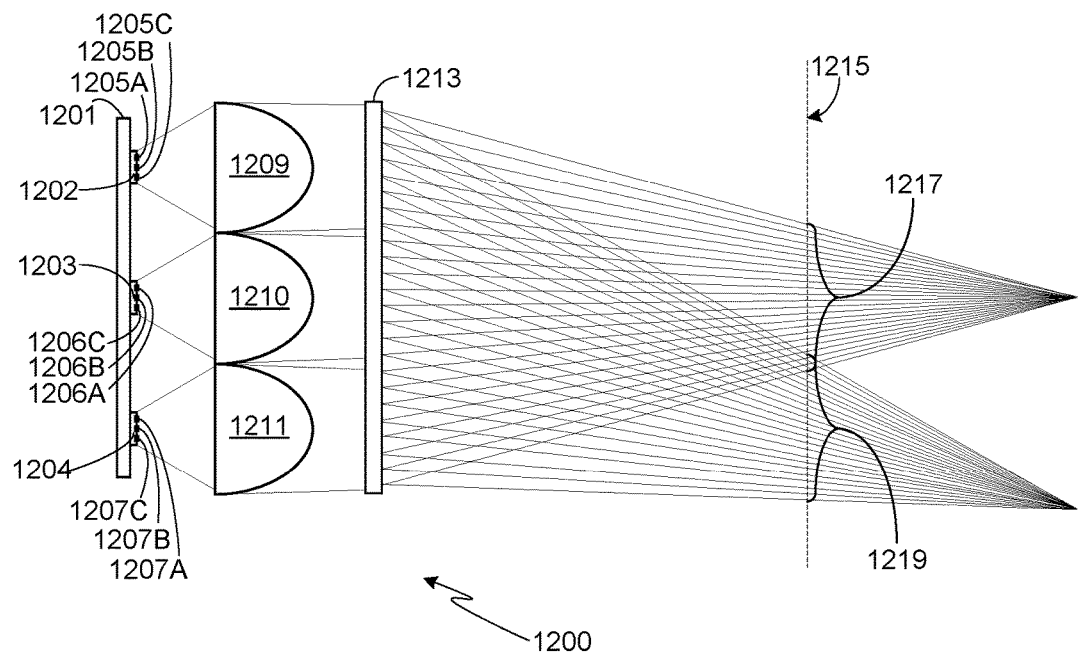
FIG. 12 schematically illustrates shifting the illumination FoV from a single light module by activating different sets of LEDs comprising the module's light source.

In the light modules of the present invention, the light emitted by each LED comprising the light source can be directed at a particular region of the horizon (i.e., the illumination FoV) using the illumination and projection MLAs described above. As a result, selectively activating and deactivating individual LEDs, or groups of LEDs, allows the light distribution to be tailored as desired. This aspect of the invention is schematically illustrated in FIG. 12. For purposes of this example, light source 1201 of module 1200 is comprised of nine LEDs divided into three LED groups 1202-1204. LED group 1202 is comprised of three LEDs 1205A-1205C; LED group 1203 is comprised of three LEDs 1206A-1206C; and LED group 1204 is comprised of three LEDs 1207A-1207C. In FIG. 12, each LED with an "A" label is represented on the page as the uppermost LED of the corresponding LED group; each LED with a "B" label is represented on the page as the center LED of the corresponding LED group; and each LED with a "C" label is represented on the page as the lowermost LED of the corresponding LED group. Corresponding to each group 1202-1204 is a collimation optic 1209-1211, respectively. The light emitted by the LEDs and collimated by optics 1209-1211 pass through optical element 1213, where optical element 1213 includes an illumination MLA, an aperture layer, and a projection MLA as previously described. The LEDs within module 1200 may or may not be shifted relative to the corresponding collimating optics as described above relative to FIG. 9, and the collimating optics may or may not be tilted as described above relative to FIG. 10, depending upon whether overlap is desired. In the embodiment illustrated in FIG. 12, the collimation optics 1209-1211 and the illumination and projection MLAs comprising element 1213 direct the light emitted by a first set of LEDs (i.e., LEDs 1205B, 1206B and 1207B) in a first direction such that when these LEDs are activated, the illumination distribution at horizon plane 1215 is approximately centered relative to the light module's centerline as shown by ray tracing group 1217. Similarly, the collimation optics 1209-1211 and the illumination element 1213 directs the light emitted by a second set of LEDs (i.e., LEDs 1205C, 1206C and 1207C) in a second direction such that when these LEDs are activated, the illumination distribution at horizon plane 1215 is moved off-center as shown by ray tracing group 1219. Thus in this example, two different regions can be illuminated individually by selectively activating different sets of LEDs, or both regions can be simultaneously illuminated by simultaneously activating both sets of LEDs. It should be understood that a single light module is not limited to two illumination regions, rather a single light module can illuminate more than two regions if desired. Thus by using individually addressable LEDs, and preferably individually addressable sets of LEDs, each of which illuminates a different area of the FoV, any region of the FoV can be illuminated as desired. Additional lighting flexibility, not only in terms of illumination region within the FoV, but also in terms of illumination homogeneity and intensity, can be achieved through the use of multiple light modules.

Figure 13A:
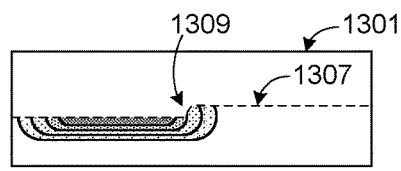
FIGS. 13A-C illustrate three different illumination intensity distributions generated by three different LED sets contained within the same light module, where the cut-off created by the aperture layer remains constant.
Figure 13B:
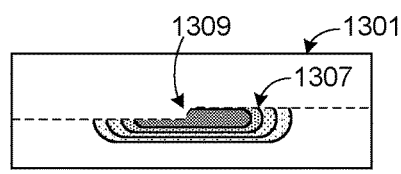
Figure 13C:
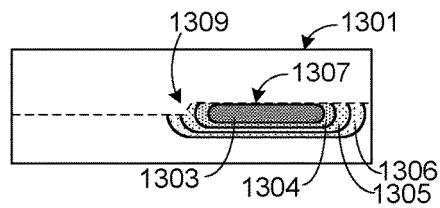

Due to the location of the aperture layer within the MLA stack, addressing different LEDs or sets of LEDs as described above relative to FIG. 12 only changes the illumination intensity distribution, not the location of any image attributes derived from the aperture layer. For example, FIGS. 13A-C illustrate three different (angular) illumination intensity distributions generated by three different LED sets contained within the same light module. For clarity, in FIGS. 13A-C the FoV is represented by 1301, while the illumination is represented by (angular) illumination intensity profiles 1303-1306, where profile 1303 represents the highest illumination intensity with a fall-off in intensity represented by profiles 1304-1306, where profile 1306 represents the lowest illustrated illumination intensity. The aperture layer used in this exemplary configuration creates an illumination cut-off line 1307, where the cut-off includes a kink 1309 that aids in shielding on-coming cars from the light. As shown, the intensity profile generated by the first set of LEDs is to the left of kink 1309; the intensity profile generated by the second set of LEDs is centered on kink 1309; and the intensity profile generated by the third set of LEDs is to the right of kink 1309.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An adaptive light module, comprising:
    an LED light source, said LED light source comprising an LED array, said LED array comprising a plurality of LEDs;
    an illumination micro-lens-array (MLA), wherein a first focal length corresponds to said illumination MLA;
    a projection MLA, wherein a second focal length corresponds to said projection MLA, and wherein said first focal length is longer than said second focal length;
    at least one collimating optic interposed between said light source and said illumination MLA, said at least one collimating optic configured to collimate light generated by said LED light source prior to said light entering said illumination MLA; and
    an aperture layer interposed between said projection MLA and said illumination MLA, said aperture layer configured to provide a cut-off in an illumination field-of-view (FoV) generated by said adaptive light module.

2. The adaptive light module of claim 1, wherein said plurality of LEDs comprising said LED array is divided into at least a first LED subset and a second LED subset, wherein said illumination MLA and said projection MLA direct light generated by said first LED subset in a first direction and direct light generated by said second LED subset in a second direction, said adaptive light module further comprising a light control system coupled to said LED light source, said light control system configured to selectively and independently activate said first LED subset and said second LED subset.

3. The adaptive light module of claim 1, further comprising a vehicle and a vehicle headlight assembly, said adaptive light module incorporated into said vehicle headlight assembly.

4. The adaptive light module of claim 1, wherein said LED array is selected from the group consisting of 1-dimensional LED arrays and 2-dimensional LED arrays.

5. The adaptive light module of claim 1, wherein said plurality of LEDs comprises said LED array divided into a plurality of LED groups.

6. The adaptive light module of claim 5, wherein said at least one collimating optic further comprises a plurality of collimating optics, wherein said plurality of collimating optics correspond to said plurality of LED groups.

7. The adaptive light module of claim 6, wherein a first optical axis of at least one of said plurality of LED groups is displaced relative to a second optical axis of a corresponding collimating optic.

8. The adaptive light module of claim 6, wherein a first optical axis of at least one of said plurality of LED groups is tilted relative to a second optical axis of a corresponding collimating optic.

9. The adaptive light module of claim 1, wherein said illumination MLA comprises a plurality of illumination optical elements and wherein said projection MLA comprises a plurality of projection optical elements, wherein said first focal length corresponds to a y-axis of each of said plurality of illumination optical elements and said second focal length corresponds to said y-axis of each of said plurality of projection optical elements, and wherein said y-axis corresponds to a horizontal plane.

10. The adaptive light module of claim 9, wherein a third focal length corresponds to a z-axis of each of said plurality of illumination optical elements of said illumination MLA, wherein a fourth focal length corresponds to said z-axis of each of said plurality of projection optical elements of said projection MLA, and wherein said z-axis is orthogonal to said y-axis.

11. The adaptive light module of claim 10, wherein said first focal length is larger than said third focal length.

12. The adaptive light module of claim 9, wherein a first cross-section corresponding to each of said plurality of illumination optical elements and a second cross-section corresponding to each of said plurality of projection optical elements has a non-regular hexagonal shape.

13. The adaptive light module of claim 12, wherein a first dimension corresponds to a first width of said non-regular hexagonal shape and a second dimension corresponds to a second width of said non-regular hexagonal shape, and wherein a ratio of said first dimension to said second dimension is between 1.5:1 and 3:1.

14. The adaptive light module of claim 9, wherein a first cross-section corresponding to each of said plurality of illumination optical elements and a second cross-section corresponding to each of said plurality of projection optical elements has a rectangular shape.

15. The adaptive light module of claim 14, wherein a first dimension corresponds to a first width of said rectangular shape and a second dimension corresponds to a second width of said rectangular shape, and wherein a ratio of said first dimension to said second dimension is between 1.5:1 and 3:1.

16. The adaptive light module of claim 1, wherein said aperture layer is applied to a planar side of said illumination MLA.

17. The adaptive light module of claim 16, wherein said aperture layer is directly deposited onto said planar side of said illumination MLA.

18. The adaptive light module of claim 1, wherein said aperture layer is applied to a planar side of said projection MLA.

19. The adaptive light module of claim 18, wherein said aperture layer is directly deposited onto said planar side of said projection MLA.

20. The adaptive light module of claim 1, wherein a distance between said aperture layer and an outer lens surface of said illumination MLA is less than said first focal length.

21. The adaptive light module of claim 1, wherein said at least one collimating optic further comprises a plurality of collimating optics, wherein said plurality of collimating optics correspond to said plurality of LEDs comprising said LED array.

22. The adaptive light module of claim 1, wherein said illumination MLA comprises a plurality of illumination optical elements and wherein said projection MLA comprises a plurality of projection optical elements, wherein said plurality of illumination optical elements are aligned with said plurality of projection optical elements.

23. The adaptive light module of claim 1, wherein said illumination MLA comprises a plurality of illumination optical elements and wherein said projection MLA comprises a plurality of projection optical elements, wherein a first dimension corresponds to a cross-section height corresponding to each of said plurality of illumination optical elements and a second dimension corresponds to a cross-section width corresponding to each of said plurality of illumination optical elements, wherein said plurality of illumination optical elements are not aligned with said plurality of projection optical elements, and wherein said plurality of projection optical elements are displaced from said plurality of illumination optical elements by less than 25 percent of said first dimension.

* * * * *